United States Patent
Kimoto et al.

(10) Patent No.: US 6,342,927 B1
(45) Date of Patent: *Jan. 29, 2002

(54) VIDEO DISPLAY APPARATUS HAVING AN ON-SCREEN DISPLAY AND METHOD FOR CONTROLLING BRIGHTNESS THEREOF

(75) Inventors: Masanobu Kimoto; Motoki Ouchiyama, both of Tokyo; Hiroyuki Nakazono, Kanagawa; Satoru Suzuki, Tokyo, all of (JP)

(73) Assignee: Sony Corporation, Tokyo (JP)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/745,938

(22) Filed: Nov. 8, 1996

(30) Foreign Application Priority Data

Nov. 9, 1995 (JP) .............................................. 7-291522

(51) Int. Cl.$^7$ ................................................. H04N 5/445
(52) U.S. Cl. ........................ 348/569; 348/563; 348/564; 348/687; 348/678; 348/686
(58) Field of Search ................................ 348/569, 570, 348/563, 564, 687, 688, 689, 678, 686, 673; H04N 5/445

(56) References Cited

U.S. PATENT DOCUMENTS

| | | | |
|---|---|---|---|
| 4,270,145 A | 5/1981 | Farina | 348/570 |
| 4,451,840 A | 5/1984 | Shanley, II | 348/600 |
| 5,345,278 A | 9/1994 | Choi | 348/686 |
| 5,386,247 A * | 1/1995 | Shafer et al. | 348/687 |
| 5,574,509 A * | 11/1996 | Citta et al. | 348/569 |
| 5,729,248 A * | 3/1998 | Hwang | 345/141 |
| 5,815,215 A * | 9/1998 | Yang | 348/569 |

FOREIGN PATENT DOCUMENTS

| | | | |
|---|---|---|---|
| DE | 4432164 | 3/1995 | G09G/1/00 |
| DE | 4440832 | 5/1995 | G11B/27/28 |
| EP | 0449106 | 10/1991 | |
| EP | 0512332 | 11/1992 | |
| EP | 0543089 | 5/1993 | |
| EP | 0627849 | 12/1994 | |
| EP | 0700207 | 3/1996 | |
| JP | 63287178 | 11/1988 | |
| JP | 05030442 | 2/1993 | |
| JP | 05056365 | 3/1993 | |
| JP | 05183845 | 7/1993 | |

* cited by examiner

Primary Examiner—Michael Lee
Assistant Examiner—Linus H. Lo
(74) Attorney, Agent, or Firm—Jay H. Maioli

(57) ABSTRACT

A video display apparatus for controlling the brightness of a display screen having an on-screen display portion in which the on-screen display can be satisfactorily read regardless of the picture brightness includes a display screen, circuitry for displaying on the display screen an on-screen display portion showing adjustment data for the video display apparatus, and circuitry for maintaining the brightness of the on-screen display portion substantially constant while the brightness of the display screen is changed. Also, a method for using the apparatus includes controlling the brightness of the display screen of the video display apparatus having an on-screen display portion while maintaining the brightness of the on-screen display portion substantially constant.

7 Claims, 4 Drawing Sheets

VIDEO DISPLAY APPARATUS HAVING AN ON-SCREEN DISPLAY AND METHOD FOR CONTROLLING BRIGHTNESS THEREOF

BACKGROUND OF THE INVENTION

The present invention relates to a video display apparatus for use with, for example, a multiscan monitor.

Currently there are monitors and television receivers which in addition to displaying an input video signal can display various adjustments and settings of the monitor by displaying characters, numerals, and graphics. This capability is called "on-screen display" and it permits the design of mechanically simpler video monitors and television receivers, thereby reducing their manufacturing costs and increasing their capabilities.

FIG. 1 of the accompanying drawings is a front view of a monitor illustrating a manner in which information is typically displayed on the display screen. As shown in FIG. 1, an information display area 18b (hereinafter "on-screen display portion") is displayed at a predetermined position of a display screen 18a and is used to display the current monitor settings by using characters, numerals, and graphics. In this example, the brightness setting of the display screen is displayed on the left side of the on-screen display portion and is indicated by the position of a pointer P in a bar graph along with corresponding numerals, and the contrast setting is displayed on the right side of the on-screen display portion also by the position of a pointer P in its corresponding bar graph along with corresponding numerals.

While these settings are being displayed on the display screen 18a, the user can change them at will by operating keys 31 to 34 installed on the monitor. When the displayed video image settings are adjusted, the corresponding graphs displayed on the on-screen display portion are changed to reflect the adjustments, thereby giving the user a visual feedback. Also, of course, the displayed video image on the display screen is changed to reflect the newly selected brightness and contrast settings. At the completion of the adjustment, the on-screen display portion is erased, ending the monitor adjustment mode and leaving on the display screen the adjusted video image. This adjustment method allows the user to make adjustments to the monitor with ease.

When the brightness of the display screen is adjusted, as described above, the brightness of the whole displayed image, including the on-screen display portion, is changed accordingly. In the case of an adjustment to make the display screen darker, the displayed images within the display screen are darkened and can become difficult to see. Therefore, when the user makes an adjustment to decrease the brightness of the display, the on-screen display portion gets darker and can become difficult to see.

In a television receiver, the brightness adjustment range is limited. Accordingly, even when the brightness of the image being displayed is adjusted to a minimum, the on-screen display portion is prevented from disappearing. On the other hand, in the case of a computer video monitor, such as a multiscan monitor, or a professional monitor, the brightness adjustment range is very wide. Therefore, when the brightness of the image being displayed is adjusted to a minimum the on-screen display portion becomes so dark that the displayed information cannot be seen.

Therefore, when the brightness is adjusted to the extent that the displayed image disappears or can barely be seen as described above, the user cannot make other adjustments because the on-screen display portion cannot be seen. This makes this desirable on-screen display feature ineffective and can lead the user to believe that the video monitor is malfunctioning.

SUMMARY OF THE INVENTION

It is an object of the present invention to provide a video display apparatus and a method for controlling the brightness of a display screen having an on-screen display portion in which the on-screen display can be satisfactorily perceived by the user regardless of the picture brightness.

This and other objects, advantages, and features of the present invention will become apparent to those skilled in the art upon consideration of the following description of the present invention.

According to one aspect of the present invention, a video display apparatus for controlling the brightness of a display screen having an on-screen display portion in which the on-screen display can be satisfactorily perceived by the user regardless of the picture brightness is provided with: a display screen; circuitry for displaying on the display screen an on-screen display portion showing adjustment data for the video display apparatus; and circuitry for maintaining the brightness of the on-screen display portion substantially constant while the brightness of the display screen is changed.

According to a second aspect of the present invention, a method for controlling the brightness of a display screen of a video display apparatus having an on-screen display portion is provided that consists of controlling the brightness of the display screen while maintaining the brightness of the on-screen display portion substantially constant.

According to the above described aspects of the present invention, because the brightness of the on-screen display portion is kept substantially constant regardless of the brightness of the display screen, the user can properly be guided through the video display adjustment process by reading the instructions on the on-screen display portion.

DETAILED DESCRIPTION OF THE INVENTION

Figure 1:
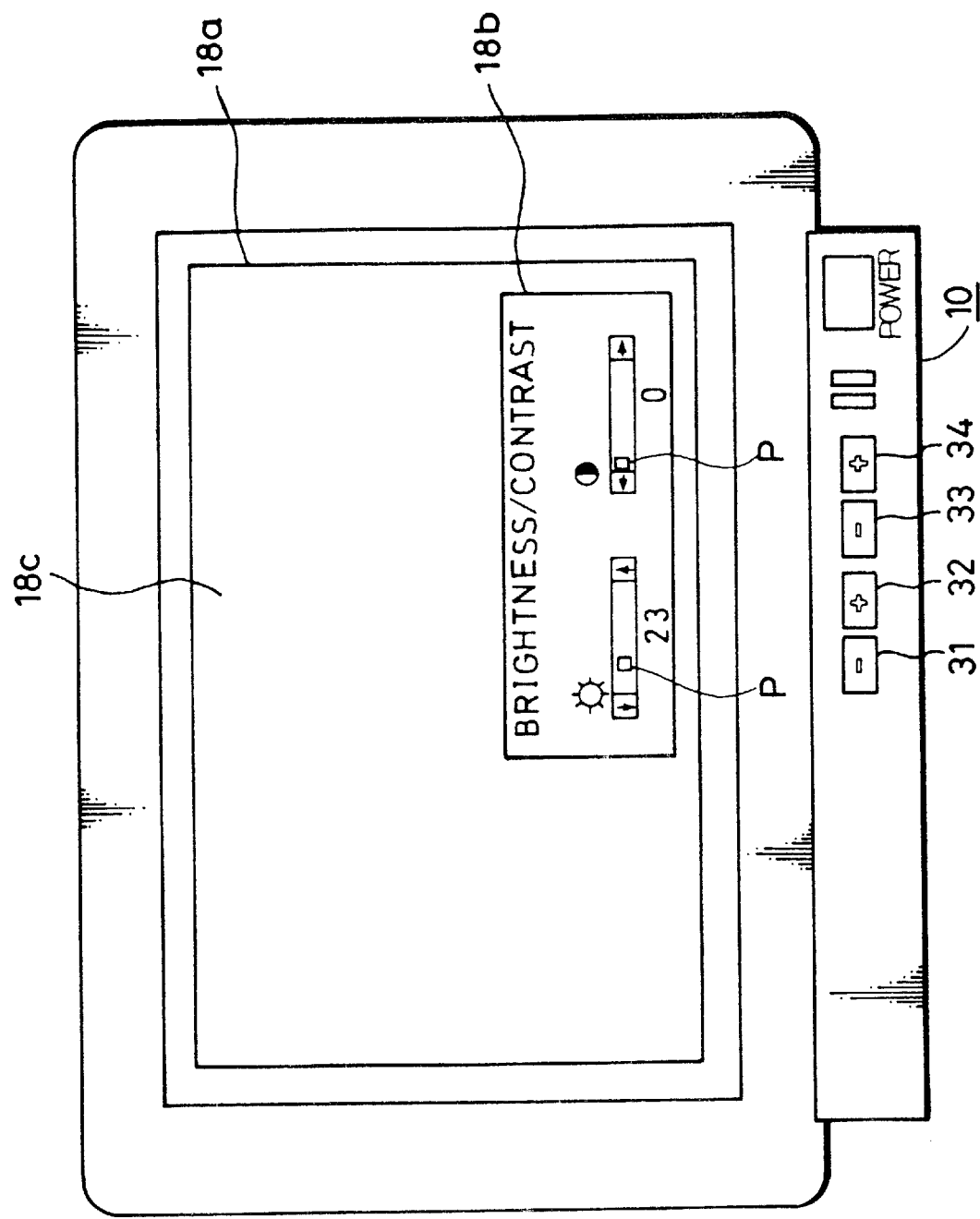
FIG. 1 is a front view of a video monitor used to explain the manner in which information is displayed.

While this invention is susceptible of embodiment in many different forms, there is shown in the drawings and will herein be described in detail specific embodiments, with the understanding that the present disclosure is to be considered as an example of the principles of the invention and not intended to limit the invention to the specific embodiments shown and described. In the description below, like reference numerals are used to describe the same, similar or corresponding parts in the several views of the drawing.

The present invention will now be described with reference to the drawings.

Figure 2:
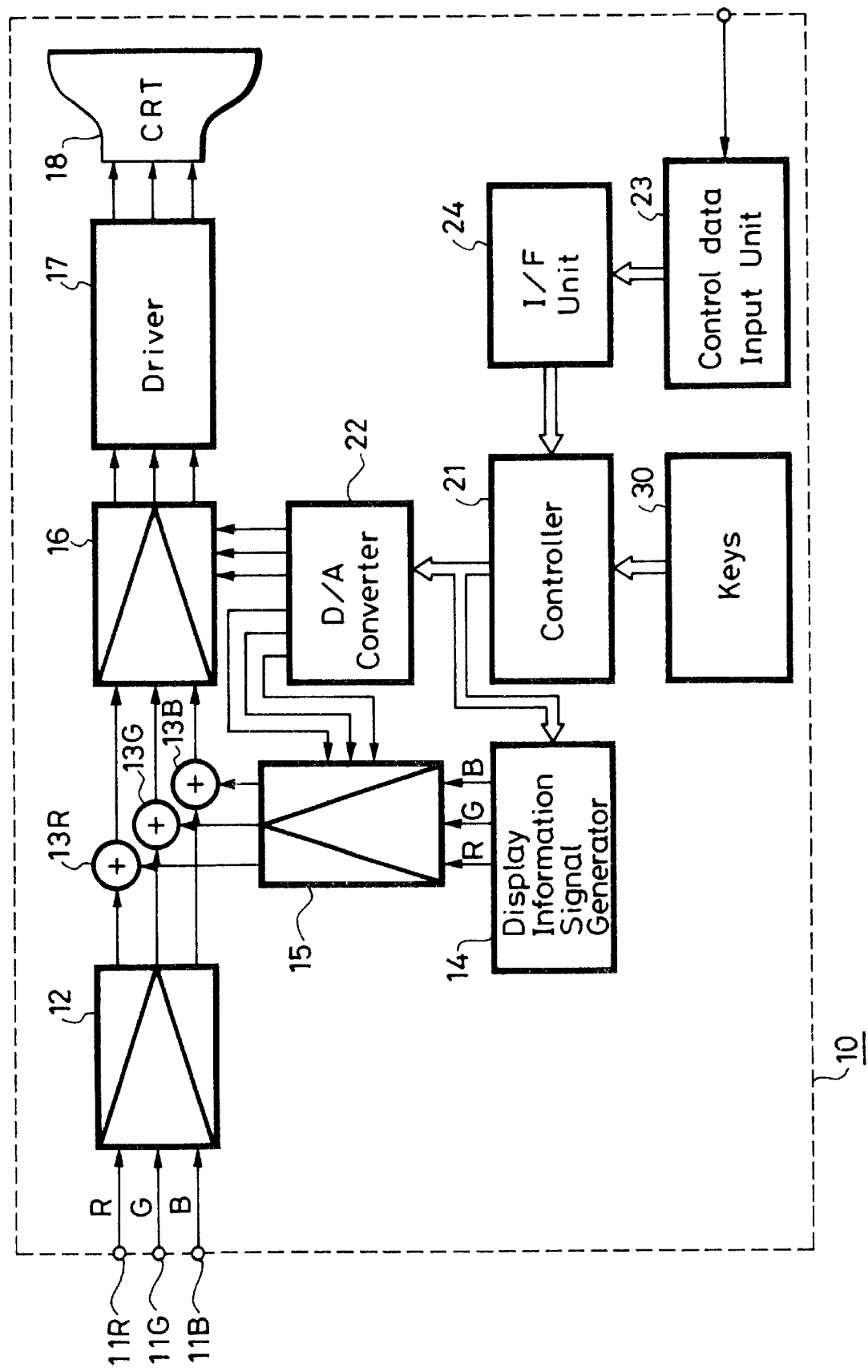
FIG. 2 is a block diagram showing a video monitor according to the present invention.

Turning now to FIG. 2, the present invention is used in a multiscan monitor, which is a monitor capable of processing an input video signal having a plurality of horizontal frequencies. A monitor 10 includes video signal input terminals 11R, 11G, and 11B. Video signals of the three primary colors, red R, green G, and blue B are supplied to the input terminals 11R, 11G, and 11B, respectively.

Next, these video signals R, G, and B are supplied through a preamplifier 12 to adders 13R, 13G, and 13B which add display information signals of the respective colors to the supplied video signals. The display information signals are video signals used to display the state of the monitor 10 at a predetermined position on a display screen by characters, numerals, and graphics. A display information signal generator 14 is used to generate display information signals represented by the three primary color signals R, G, and B under the control of a controller 21, which will be described later. The display information signals of the respective colors are amplified by a display information amplifier 15 and then supplied to the adders 13R, 13G, 137B respectively.

The video signals added with the display information signals by the adders 13R, 13G, 13B are supplied to a video amplifier 16 and amplified by the variable gain of the video amplifier 16. The amplified R, G, and B signals are supplied to a driver 17 to drive an electron gun (not shown) of a color cathode-ray tube (color CRT) 18, thereby displaying an image on the display screen of the color CRT 18.

Figure 3:
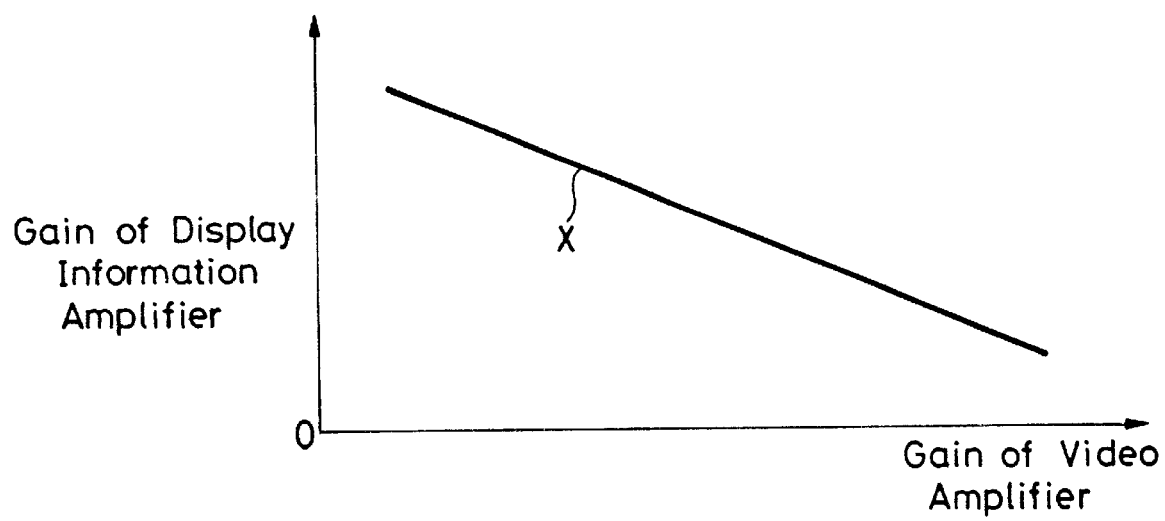
FIG. 3 is a graph showing the manner in which brightness is controlled.

The gain of the video amplifier 16 and the display information amplifier 15 are set based on control data output by the controller 21. Specifically, the controller 21 controls the operations of the respective portions of the monitor 10 by outputting control data based on the variable settings of the monitor, including data related to the gain of the amplifiers 15 and 16, to a digital-to-analog (D/A) converter 22. The D/A converter 22 generates voltage signals corresponding to the gain control data and supplies them to the video amplifier 16 and to the display information amplifier 15, thereby setting the respective gains. In this case, when the gain of the video amplifier 16 is changed in one direction under control of the controller 21, the gain of the display information amplifier 15 is changed in the opposite direction. This gain control curve is shown in FIG. 3 by an "X" showing that when the gain of the video amplifier 16 is increased, the gain of the display information amplifier 15 is decreased.

The monitor 10 according to this embodiment includes a plurality of keys 30. Information input by the user operating the keys 30 is supplied to the controller 21. When the adjustment mode is selected by use of the keys 30, the controller 21 instructs the display information signal generator 14 to generate the corresponding display information signals. These display information signals are added to the input video signals 11R, 11G, 11B, and supplied to the driver 17, thereby displaying on the monitor the settings that can be adjusted as well as their present adjustment state. Next, when the brightness setting of the display screen is changed by operating the keys 30, the controller 21 outputs control data for varying the gains of the video amplifier 16 and the display information amplifier 15. Specifically, when the operation for brightening the display screen is executed, the controller 21 increases the gain of the video amplifier 16 and decreases the gain of the display information amplifier 15. Conversely, when the operation for darkening the display screen is executed, the controller 21 decreases the gain of the video amplifier 16 and increases the gain of the display information amplifier 15.

The monitor 10 according to this embodiment also includes a control data input unit 23 for supplying control data input from some external source (not shown) Control data supplied to the control data input unit 23 is supplied through an interface unit (I/F unit) 24 to the controller 21. Then, as in the case where the keys 30 are operated, the data supplied to the control data input unit 23 is supplied to the controller 21, which instructs the display information signal generator 14 to generate the corresponding display information signals. The gains of the video amplifier 16 and the video display information amplifier 15 are then similarly changed as described above and as shown in FIG. 3.

Figure 4:
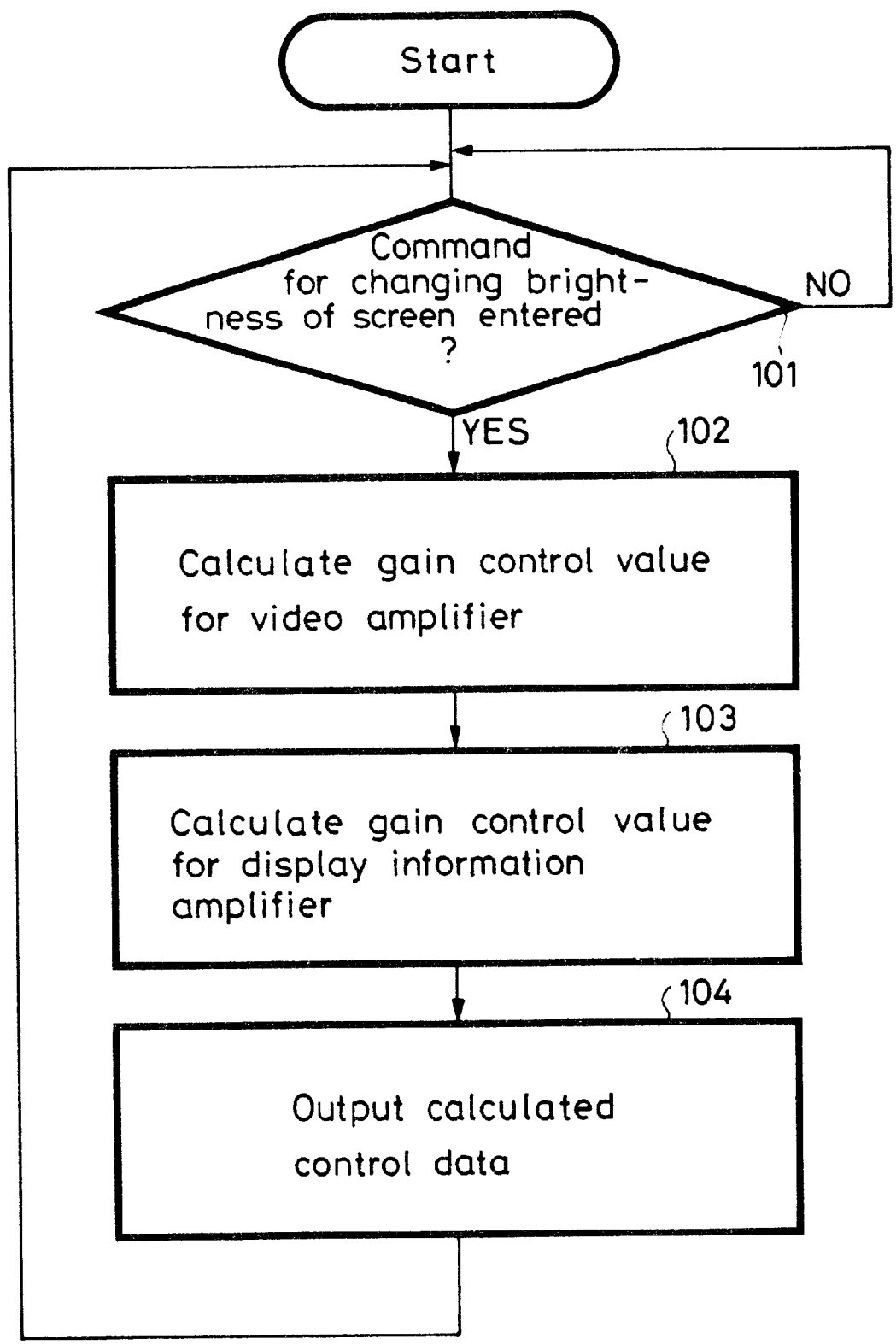
FIG. 4 is a flowchart of the brightness control processing.

Now turning to FIG. 4, the method for adjusting the brightness of an image displayed on the display screen of the color CRT 18 will be described.

Following the start of operation, it is determined at decision step 101 whether the command for changing the brightness is entered by the operating keys 30 or the control data input unit 23. If this command is entered as represented by a YES at decision step 101, then control goes to step 102, where the gain control value for the video amplifier 16 is calculated. Then, control goes to step 103, where the gain control value for the display information amplifier 15 is calculated.

The gain control value for the video amplifier 16 in step 102 is such that it is increased when the brightness of the display screen is increased, and it is decreased when the brightness of the display screen is decreased. The gain control value for the display information amplifier 15 is set to the value shown on the curve X in FIG. 3, which is in inverse proportion to the change of the gain control value for the video amplifier 16.

The gain control values calculated at steps 102 and 103 are supplied to the D/A converter 22. Then, voltage signals resulting from D/A-converting the control values by the D/A converter 22 are supplied to the video amplifier 16 and the display information amplifier 15 at a step 104, thereby setting the brightness of the displayed image on the color CRT 18. Finally, control goes back to step 101.

When using the brightness adjustment method described above, the brightness of the adjustment information displayed in the display screen is kept constant. Therefore, even when the brightness of the display screen is adjusted to a minimum, the adjustment information displayed can be kept at a proper constant level.

Returning to FIG. 1, when the monitor 10 is placed in the brightness adjustment mode, the on-screen display portion 18b is displayed on the right side of the display screen 18a and is used to display the current monitor settings by using characters, numerals, and graphics. In this example, the brightness setting of the display screen is displayed on the left side of the on-screen display portion and is indicated by the position of a pointer P in a bar graph, along with corresponding numerals, and the contrast setting is displayed on the right side of the on-screen display portion also by the position of a pointer P in its corresponding bar graph and numerals.

While these settings are being displayed on the display screen 18a, the user can change them at will by operating keys 31 to 34 installed on the monitor. When the key 31 is depressed brightness is decreased, and when key 32 is depressed brightness is increased.

When the user continues to press the key 31, the gain of the video amplifier 16 is lowered so that brightness of the display screen 18a, other than the on-screen display portion 18b, is decreased progressively, thereby allowing the user to read the adjustment information. Since the gain of the display information amplifier 15 is changed in inverse proportion to the gain of the video amplifier 16, even when the brightness of the display screen is decreased, the brightness of the on-screen display portion 18b is kept constant, allowing the adjustment information to be read regardless of the adjusted brightness.

While in this embodiment the gain of the video amplifier 16 is linearly changed in inverse proportion to the gain of the display information amplifier 15 so that the brightness of the displayed information on the display screen is kept constant regardless of the brightness adjustment, the brightness of the displayed information may not need to be always constant. For example, when the range in which a brightness of the display screen is sufficient to permit reading the displayed information, it may be desired to adjust the brightness of the display using this invention only when such brightness falls outside of that range.

While in this embodiment the brightness of the display information is controlled only when the brightness of the displayed image is adjusted, the present invention is not limited thereto and the brightness of display information may be controlled and kept substantially constant if other adjustments concerning the brightness of the displayed image are carried out. For example, even when displayed signals of other colors are darkened by adjusting hues of the red signal R, the green signal G, and the blue signal B, the brightness of display information may be kept substantially constant by changing the gain of the color corresponding to the display information amplifier 15. Also, when the brightness is changed in accordance with the adjustment of contrast or something else, the brightness of the displayed information may be kept substantially constant by changing the gain of the display information amplifier 15.

While the present invention has been described as applied to a monitor or a television using a CRT as described above, it is evident that many alternatives will become apparent to those skilled in the art in light of the foregoing description. For example, the present invention may be applied to monitors or televisions using other display means. Also, while the input video signals are the three primary color signals red R, green G, and blue B as described above, the present invention may be applied to monitors to which video signals of other systems are the input.

According to the present invention, because the brightness of the on-screen display portion is kept substantially constant regardless of the brightness of the display screen, the user can properly be guided through the video display adjustment process by reading the instructions on the on-screen display portion.

Thus, it is apparent that in accordance with the present invention an apparatus and method that fully satisfies the objectives, aims, and advantages is set forth above. While the invention has been described in conjunction with specific embodiments, it is evident that many alternatives, modifications, permutations, and variations will become apparent to those skilled in the art in light of the foregoing description. Accordingly, it is intended that the present invention embrace all such alternatives, modifications and variations as fall within the scope of the appended claims.

What is claimed is:

1. A video display apparatus comprising:
   a display screen;
   a video amplifier for controlling a gain of signals fed thereto so as to control a brightness of a video image displayed on said display screen;
   a display information signal generator for generating display information signals for displaying on said display screen a representation of adjustment data for said display screen;
   an on-screen display amplifier for controlling a gain of the display information signals and producing output signals fed to said video amplifier;
   a user input unit for selecting a brightness setting of said display screen; and
   means for controlling said video amplifier and said on-screen display amplifier and for calculating the gain of said on-screen display amplifier so as to control a brightness of said representation of adjustment data and for calculating the gain of said video amplifier so as to control the brightness of said video image on said display screen in response to a selected brightness setting from said user input unit, wherein the calculated gain of said on-screen display amplifier is in an inverse relationship to the calculated gain of said video amplifier, so that when said brightness of said video image on said display screen is decreased the gain of said on-screen display amplifier is increased and the brightness of said representation of adjustment data is maintained at a substantially constant brightness even when said brightness of said video image on said display screen falls to a minimum of a visible range.

2. The video display apparatus according to claim 1, in which said display screen is comprised of a cathode-ray tube.

3. The video display apparatus according to claim 2, in which said display apparatus is comprised of a multi-frequency monitor.

4. A video display apparatus comprising:
   display means having a display screen;
   input terminal means for receiving a video signal for display on said display screen;
   a video amplifier for controlling a gain of signals fed thereto and receiving said video signal;
   a display information signal generator for generating display setting information signals;
   an on-screen display amplifier for controlling a gain of the display setting information signals and producing output signals fed to said video amplifier to display the display setting information on said display screen;
   a user input unit for selecting a brightness setting of said display screen; and
   means for controlling said video amplifier and said on-screen display amplifier and for calculating the gain of said on-screen display amplifier so as to control the brightness level of said display setting information in response to a selected brightness setting and for calculating the gain of said video amplifier in response to the selected brightness setting, wherein the calculated gain of said on-screen amplifier is in an inverse relationship to the calculated gain of said video amplifier, so that when the brightness level of said display screen is decreased the gain of said on-screen display amplifier is increased and the brightness of said display setting information is maintained at a substantially constant brightness even when said level of said display screen falls to a minimum of a visible range.

5. The video display apparatus according to claim 4, in which said gain control means comprises:
   a first gain control amplifier for controlling the level of said display setting information;

adding means for adding said video signal and an output of said first gain control amplifier; and a second gain control amplifier for controlling a level of an output of said adding means, wherein respective directions of gain control of said first and second gain control amplifiers are opposed to each other, thereby maintaining the level of said display setting information substantially constant.

6. The video display apparatus according to claim 5, in which said video display apparatus comprises a multi-frequency monitor.

7. A method for controlling a brightness of a display screen and a brightness of an on-screen display portion in a video display apparatus comprising the steps of:

entering a user selected brightness setting for said display screen;

calculating a first gain control value of a video amplifier in response to the selected brightness setting;

calculating a second gain control value of a display information amplifier in response to the selected brightness setting, wherein said second gain control value is in inverse proportion to said first gain control value;

controlling the brightness of said display screen in response to the selected brightness setting; and controlling the brightness of said on-screen display portion in an inverse relationship to the brightness of said display screen, so that when said brightness of said display screen is decreased the gain of said on-screen display amplifier is increased and the brightness of said on-screen display portion is maintained substantially constant even when the brightness of said video image falls to a minimum of a visible range.

* * * * *